UNITED STATES PATENT OFFICE 2,684,386

HALOGENATED O,O' DIHYDROXY DIPHENYL METHANE ALKYL ETHER

Max E. Chiddix, Easton, and Marjorie R. Williams, Pen Argyl, Pa., assignors to General Aniline & Film Corporation, New York, N. Y., a corporation of Delaware No Drawing. Application December 13, 1950, Serial No. 200,686

7 Claims. (Cl. 260—613)

This invention relates to new compositions of matter comprising halogenated o,o' dihydroxy diphenyl methane alkyl ethers.

Particularly the invention relates to new compounds having the following general formula:

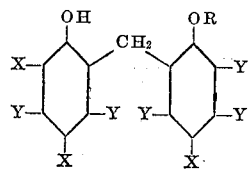

where Y is hydrogen or halogen (chloro, bromo, iodo) X is halogen and R is alkyl (methyl, ethyl, propyl, etc.)

This unsymmetrical type of compound is prepared by reacting a halogen substituted 2-hydroxybenzyl alcohol with an alkyl ether of halogen substituted phenol in the presence of an acid condensing agent such as sulfuric acid. For example:

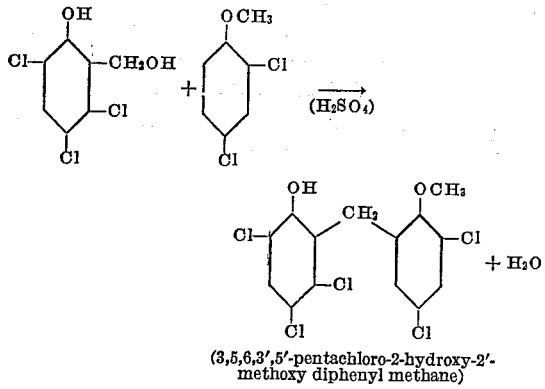

(3,5,6,3',5'-pentachloro-2-hydroxy-2'-methoxy diphenyl methane)

Examples of the halogenated 2-hydroxybenzyl alcohols include 2-hydroxy-3,5-dichlorobenzyl alcohol, 3,4,5,6-tetrachloro-2-hydroxybenzyl alcohol, 3,5,6-trichloro-2-hydroxy benzyl alcohol as well as other halogenated hydroxy benzyl alcohols whose preparation is disclosed in copending application Serial No. 184,521 filed September 12, 1950.

The halogenated phenyl alkyl ethers are made by alkylation of the corresponding halogenated phenols. Examples of operable halogenated phenols include p-chloro, p-iodo- and p-bromophenol, 2,4- and 3,4-dibromophenol, 2,4-dichlorophenol, 2,4,5-tribromo and trichlorophenol.

The 3 and 5 positions of the 2-hydroxybenzyl alcohol should be blocked by a substituent such as halogen in order to prevent self condensation during the reaction with a resultant polymer formation. Halogen is the best substituent because it increases the acidity of the phenolic group. The para position of the anisole should also be substituted with halogen to prevent condensation at this position.

These unsymmetrical type compounds are of importance for use as germicides or fungicides, particularly as germicides in soap.

This invention may be illustrated by the following examples, but it will be understood that variations and substitutions may be made within the scope of the claims.

Example 1

In a 250 ml. flask equipped with a stirrer and thermometer was charged 40 parts by weight 100% sulfuric acid, and 60 parts by weight glacial acetic acid. To this acid mixture was added 8.9 parts by weight 2,4-dichloroanisole. The temperature of the reaction mixture was raised to 65° C., and 11.4 parts by weight 2-methylol-3,4,6-trichloro phenol was added gradually at 60–70° C. over a period of ten minutes. The mixture was stirred at 60–70° C. for four hours. In approximately two hours a thick oil began to precipitate out. This oil gradually solidified upon continued stirring of the reaction mixture at room temperature. The sticky solid was filtered by suction, washed with water, and then low boiling petroleum ether. After drying in a vacuum desiccator, the brown product weighed 14.5 parts by weight (75% of theory). A small amount of the product was recrystallized from benzene, filtered, and washed with low boiling petroleum ether and had a melting point of 139–40° C. A further recrystallization from benzene yielded a while crystalline solid with a melting point of 140–41° C. The melting point was raised to 141.5–142.5° C. by a subsequent recrystallization from methanol. Analysis: Calculated for $C_{14}H_9O_2Cl_5$ (MW 386.5); Cl, 45.93%. Found: Cl, 45.34%.

Example 2

A mixture of 5.3 parts by weight 2,4,5-trichloroanisole and 5.7 parts by weight 2-methylol-3,4,6-trichlorophenol was warmed with stirring to 80° C. To this melt was added dropwise and with constant stir 3.3 parts by weight of 20% oleum. The temperature which rose to 140° C. was allowed to drop to 135° C. and was held there approximately two minutes. The product was treated with a solution of 5 parts by weight sodium hydroxide in 50 parts by weight water and brought to a boil. The insoluble material was filtered off hot and washed with water. Upon standing overnight a tan solid precipitated out of the combined mother liquor and wash liquor. The solid was filtered, washed with water and dried. The dry solid weighed 4.0 parts by weight (38.1% of theory) and had a melting point of 130–139° C. A small sample was dissolved in benzene, treated with Nuchar and filtered hot. The crystals obtained from the cooled filtrate were recrystallized twice from methanol, yielding a white solid with a melting point of 151–3° C. Analysis: Calculated for $C_{14}H_8O_2Cl_6$ (MW 420.9); Cl, 50.54%. Found: Cl, 50.72%.

It will be understood that other hydroxy benzyl alcohols and other alkyl ethers of halogenated phenols may be substituted in the above examples.

Following is a partial list of compounds which are thus formed:

3,5,6,3',5' - pentachloro - 2 - hydroxy - 2' - methoxy diphenyl methane 3,5,6,3',5',6' - hexachloro - 2 - hydroxy - 2'-methoxy diphenyl methane 3,5,6 tribromo-3',5' dichloro-2-hydroxy-2'-methoxy diphenyl methane 3,4,5,6,3',5' - hexachloro - 2 - hydroxy - 2' -methoxy diphenyl methane 3,5,6,3',5' - pentabromo - 2 - hydroxy - 2' - methoxy diphenyl methane 3, 5, 6, 5' - tetrachloro - 2 -hydroxy - 2' - methoxy diphenyl methane The products may be mixed with soap particularly in the bar form, in percentages of from ½ to 5% based on the soap to form a germicide. The compounds are also useful as ultra violet absorbers and are useful in rubber compounding.

The compounds are of value as insecticides, pesticides and as biocides in general.

What we claim is:
1. A compound of the general formula:

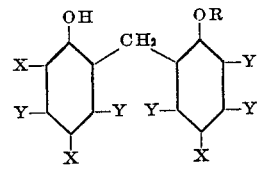

where Y is selected from the group consisting of hydrogen and halogen, X is halogen and R is a lower alkyl hydrocarbon radical.

2. A process for preparing a compound of the general formula:

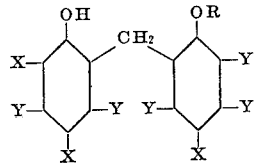

where Y is selected from the group consisting of hydrogen and halogen, X is halogen and R is a lower alkyl hydrocarbon radical which comprises reacting a halogenated substituted 2-hydroxy benzyl alcohol with an alkyl ether of a halogen substituted phenol in the presence of an acid condensing agent.

3. 3,5,6,3',5' - pentachloro - 2 - hydroxy - 2'- methoxy diphenyl methane.

4. 3,5,6,3',5',6' - hexachloro - 2 - hydroxy - 2'- methoxy diphenyl methane.

5. 3,5,6 - tribromo - 3',5' - dichloro - 2 - hydroxy-2'-methoxy diphenyl methane.

6. 3,4,5,6,3',5' - hexachloro - 2 - hydroxy - 2'- methoxy diphenyl methane.

7. 3,5,6,5' - tetrachloro - 2 - hydroxy - 2'- methoxy diphenyl methane.

References Cited in the file of this patent

UNITED STATES PATENTS

| Number | Name | Date |
|---|---|---|
| 797,024 | Sparre | Aug. 15, 1905 |
| 1,801,901 | Britton et al. | Apr. 21, 1931 |
| 2,250,480 | Gump | July 29, 1941 |
| 2,272,268 | Gump | Feb. 10, 1942 |
| 2,285,625 | Taylor et al. | June 9, 1942 |
| 2,331,265 | Coleman et al. | Oct. 5, 1943 |
| 2,354,013 | Gump | July 18, 1944 |
| 2,435,593 | Luthy et al. | Feb. 10, 1948 |
| 2,455,703 | Reuter | Dec. 7, 1948 |
| 2,504,064 | Bock et al. | Apr. 11, 1950 |
| 2,559,986 | Musser | July 10, 1951 |

OTHER REFERENCES

Granger, "Industrial and Engineering Chemistry," vol. 24 No. 4, pages 442–448, April 1932.